W. B. FENN.
MACHINE FOR CUTTING GREEN CORN FROM THE COB.
APPLICATION FILED APR. 6, 1915.

1,282,791.

Patented Oct. 29, 1918.
5 SHEETS—SHEET 1.

WITNESSES

William B. Fenn
INVENTOR

BY Edwin P. Corbett
ATTORNEY

W. B. FENN.
MACHINE FOR CUTTING GREEN CORN FROM THE COB.
APPLICATION FILED APR. 6, 1915.
1,282,791.
Patented Oct. 29, 1918.
5 SHEETS—SHEET 4.
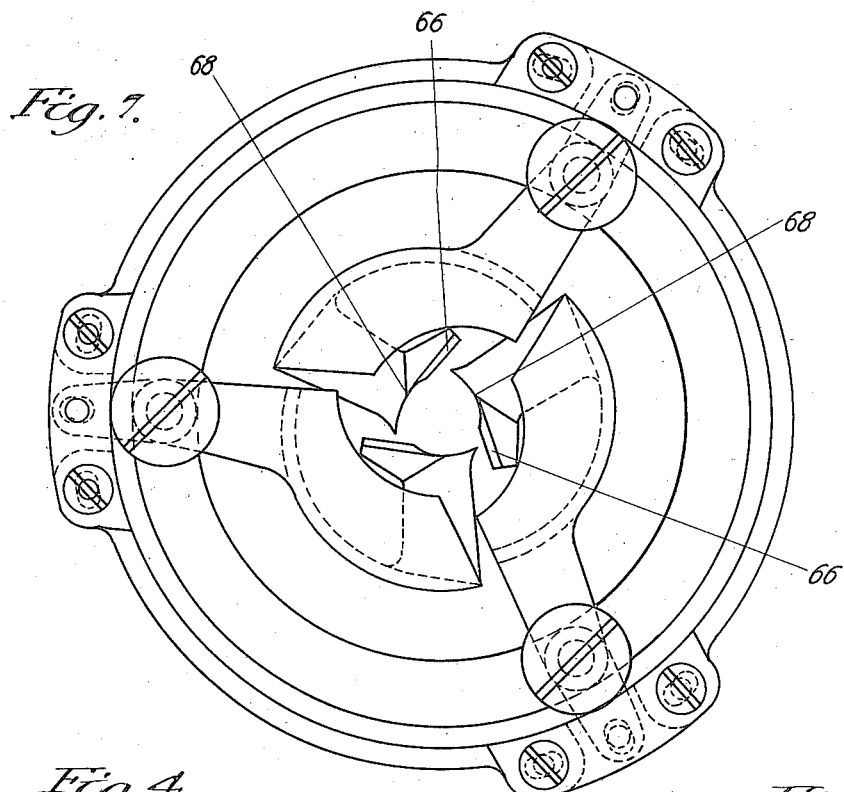
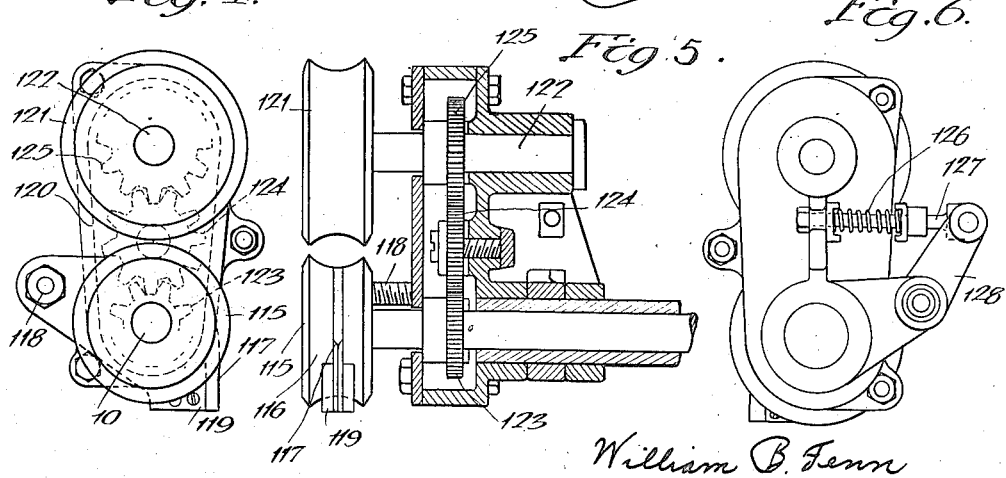
WITNESSES:
INVENTOR.
ATTORNEYS.

W. B. FENN.
MACHINE FOR CUTTING GREEN CORN FROM THE COB.
APPLICATION FILED APR. 6, 1915.

1,282,791.

Patented Oct. 29, 1918.
5 SHEETS—SHEET 5.

William B. Fenn INVENTOR.

BY Edwin F. Corbett
ATTORNEYS.

WITNESSES:
F. W. Ives
James H. Platt.

UNITED STATES PATENT OFFICE.

WILLIAM B. FENN, OF COLUMBUS, OHIO, ASSIGNOR TO WEDOIT COMPANY, OF COLUMBUS, OHIO, A CORPORATION OF OHIO.

MACHINE FOR CUTTING GREEN CORN FROM THE COB.

1,282,791.

Specification of Letters Patent.

Patented Oct. 29, 1918.

Application filed April 6, 1915. Serial No. 19,500.

*To all whom it may concern:*

Be it known that I, WILLIAM B. FENN, a citizen of the United States of America, residing at Columbus, in the county of Franklin and State of Ohio, have invented certain new and useful Improvements in Machines for Cutting Green Corn from the Cob, of which the following is a specification.

My invention relates to machines for cutting green corn from the cob and consists in the embodiment of such principles in a machine of this nature that a high degree of efficiency is attained in the removal of the kernels of corn from the cobs which are successively passed through the machines.

My improvements are particularly applicable to machines of the type wherein the kernels of corn are removed by a spiral cutting action, this being effected in the illustrated machine by feeding the ears longitudinally into subjection to radially disposed knives mounted upon a rotating frame. These knives preferably travel at a high rate of speed and a problem of utmost importance in the development of this machine has relation to the provision of a means whereby the ears of corn are properly offered and are presented to the knives initially and throughout the cutting operation in a manner to insure accurate cutting. The most important part of the feeding action in a machine of this type seems to be the initial presentation of the ears of corn to the cutting knives. When the machine is operating at the desired speed, the knife frame preferably travels at a rate of about 450 revolutions per minute. It will at once be perceived that there is a terrific torsional stress exerted upon the ears of corn by the knives. This is particularly dangerous during the initial contact of the knives with each ear for the points of the ear are springy and comparatively weak. After the knives have attained a start in the cutting action upon the ears, the stress is still very great but not quite so great as in the initial stage.

My invention, broadly considered, consists in providing means whereby each ear of corn, after starting and during cutting, is gripped at at least two points, one above the other, by relatively yieldable means. More than two points of gripping are desirable, but it is essential that there be at least two points. This states the invention as applied to the cutting operation, including the starting of cutting and the cutting.

An almost distinct stage of the operation, however, is the starting of the cutting and one of the essentials of my invention consists in the fact that, in starting the cutting operation, the ears are gripped, while feeding, at at least two points, one above the other by relatively yieldable means.

Another distinct stage of the operation may be defined as after starting and during cutting. In this stage, it is necessary that the ear be gripped at at least two points, one above the other, by relatively yieldable means.

Somewhat different conditions exist in these two different stages and my improvement is an improvement of both of these stages by the provision in the illustrated type of machine, of superposed relatively yieldable means in each stage whereby the ears of corn, inevitably of constantly varying form, are presented to the cutting blades in an unvarying line of passage precluding gouging and digging of cutting knives into the cob and insuring an even commercial cut. I believe that the importance of this action cannot be overestimated.

A primary feature of my invention also consists in the provision of knives whose cutting edges are automatically movable in conforming to the cob variations, along a radius of the cob as opposed to the chord of an arc of the cob.

Further features of importance and specific illustrations of structure embodying the features outlined above will appear as this description progresses in conjunction with the appended drawings wherein similar characters of reference designate corresponding parts, and wherein:

Fig. 4 is a detail in side elevation, of a modified form of feeding roll structure which may be used in my improvement.

Fig. 5 is a front elevation, partially in section, of the structure shown in Fig. 4.

Fig. 6 is a rear elevation of the structure shown in Figs. 4 and 5.

Fig. 7 is a plan view of the knife structure preferably used by me in the machine illustrated.

Figure 1:
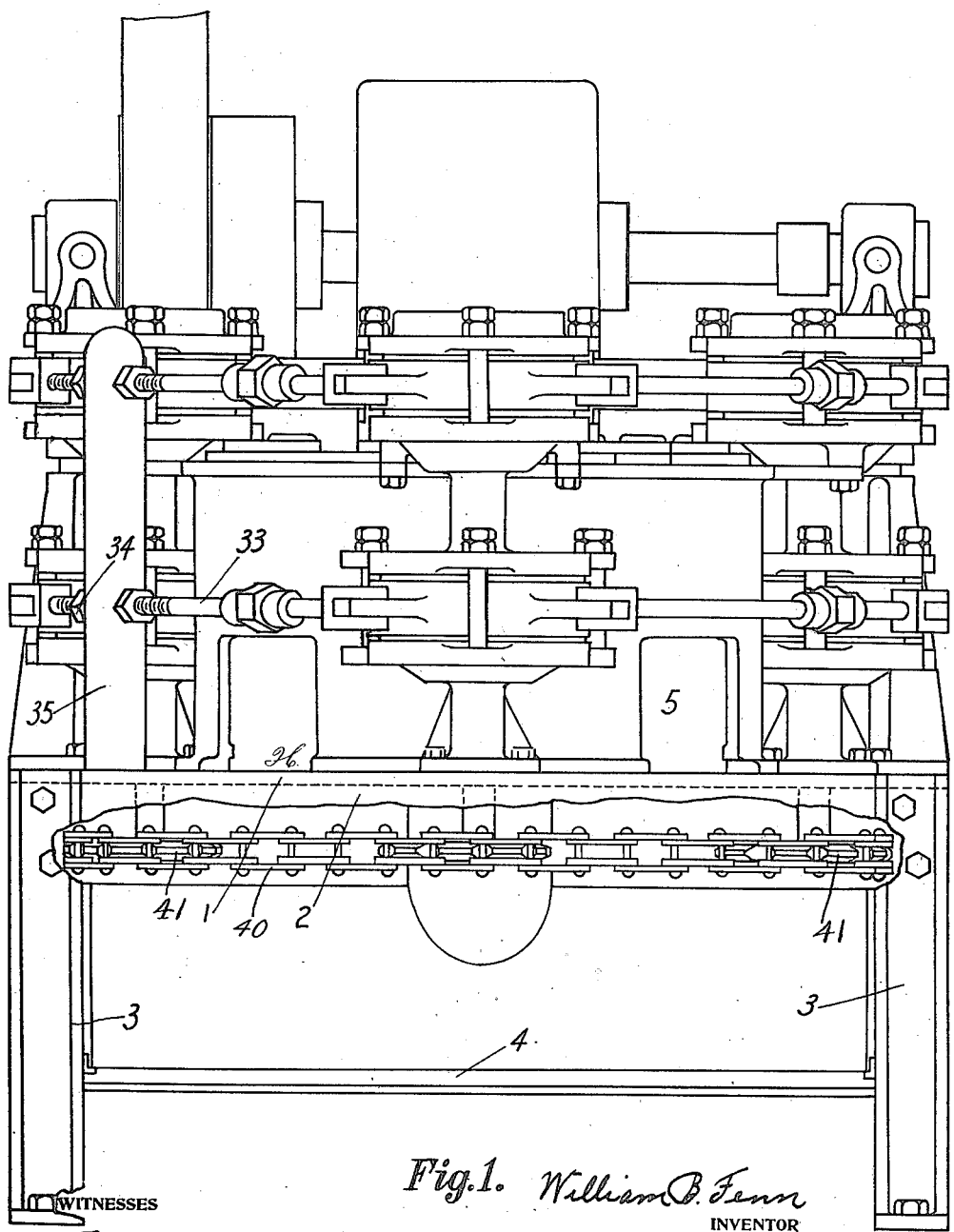
Figure 1 is an end elevation, partially broken away, of a machine embodying my invention.

In the drawings, the machine is shown as comprising a rectangular plate having depending side and end flanges 2 and supported upon legs 3 which may be braced as at 4. Extending upwardly from the plate 1 a three triangularly disposed points are shaft housings 5 which contain the mechanism illustrated in Fig. 3 for supporting and driving the feed rollers as will be subsequently described. It will be apparent from this figure that these shaft housings are disposed to form a triangle and from them there extend inwardly feed rollers forming co-active sets of rollers to receive and propel the ears of corn past the knife structure and into a discharge receptacle to be provided. These sets of rollers may be best described by referring to them as upper feed rollers and lower feed rollers.

In between the upper and lower feed rollers is disposed the knife structure which preferably comprises a rotatable element carrying knife arms which extend radially inward or substantially so and are held in their innermost position by resilient means, shown in the present instance as a single ring joining the knife arms beyond their pivots and controlled in operation by coil springs.

It will be noted that suitable mechanism is provided for driving the feeding rollers and for operating the knife structure. The feeding rollers receive and propel the ears of corn longitudinally against the knives of the knife structure, and the rotation of the knife structure coupled with the longitudinal movement of the ears of corn results in a spiral cutting action, possibly better understood as the "draw" cut. Having thus outlined the general operation, I shall attempt to describe the different units of my machine in detail treating them practically independently to facilitate a ready understanding of the machine.

Figure 3:
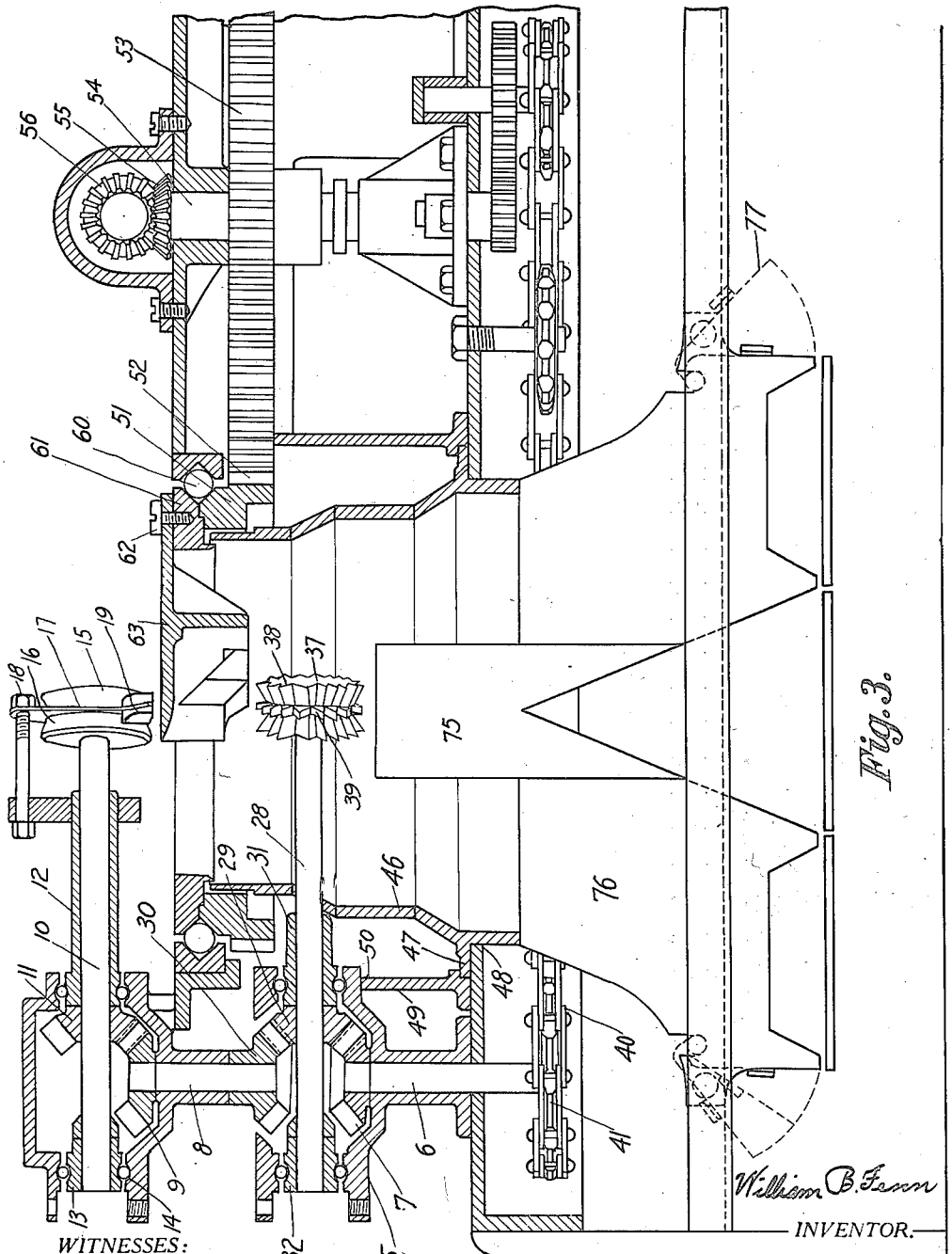
Fig. 3 is a vertical longitudinal section of one end of my machine.
Figure 8:
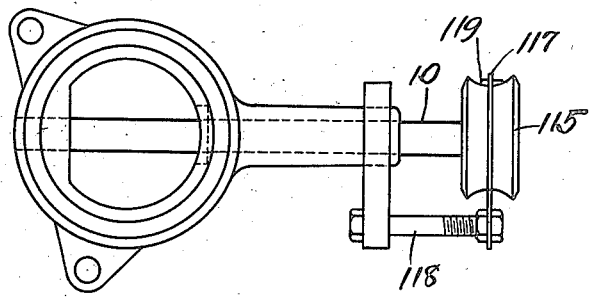
Fig. 8 is a top plan view of one of the upper feeding roller units embodied in the preferred form of my machine illustrated.
Figure 9:
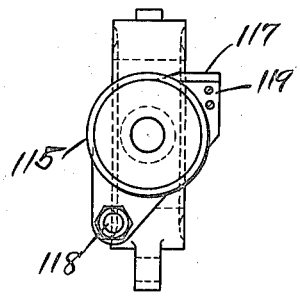
Fig. 9 is an end elevation looking from the right of Fig. 8.
Figure 10:
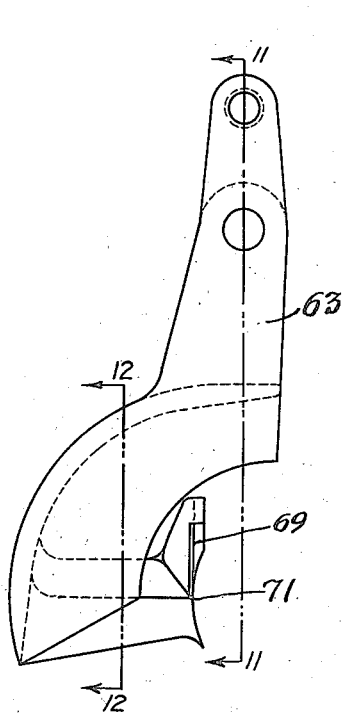
Fig. 10 is a plan view of one of the knife elements used by me and illustrating the location of the cutting edge of the knife on such elements so that it will travel along or substantially along the radius of the cob.
Figure 11:
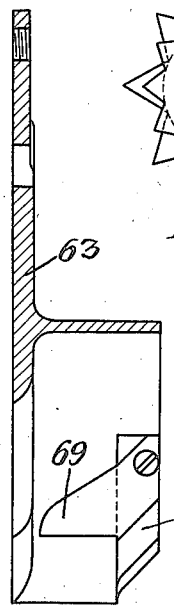
Fig. 11 is a section taken along line 11—11 of Fig. 10.

The upper feed rollers comprise three units which are mounted as illustrated in the left hand side of Fig. 3. Each of these units, as shown in this figure, comprises a shaft housing 5 as above noted, a vertical shaft 6 carrying a bevel gear 7, a superposed concentric shaft 8 and a bevel gear 9. The bevel gear 9 drives a shaft 10 extending radially inward therefrom by means of a bevel gear 11 rigidly secured to such a shaft 10. The shaft 10 is rotatably journaled in sleeve structure 12 and 13 and this sleeve structure has a ball bearing mounting at 14 so that it may swing in an arc, moving the roller end of the shaft 10 toward or away from the coöperative rollers so that the feeding rollers may conform in spacing to the different sizes of ears of corn and the variations in every ear of corn.

Figure 2:
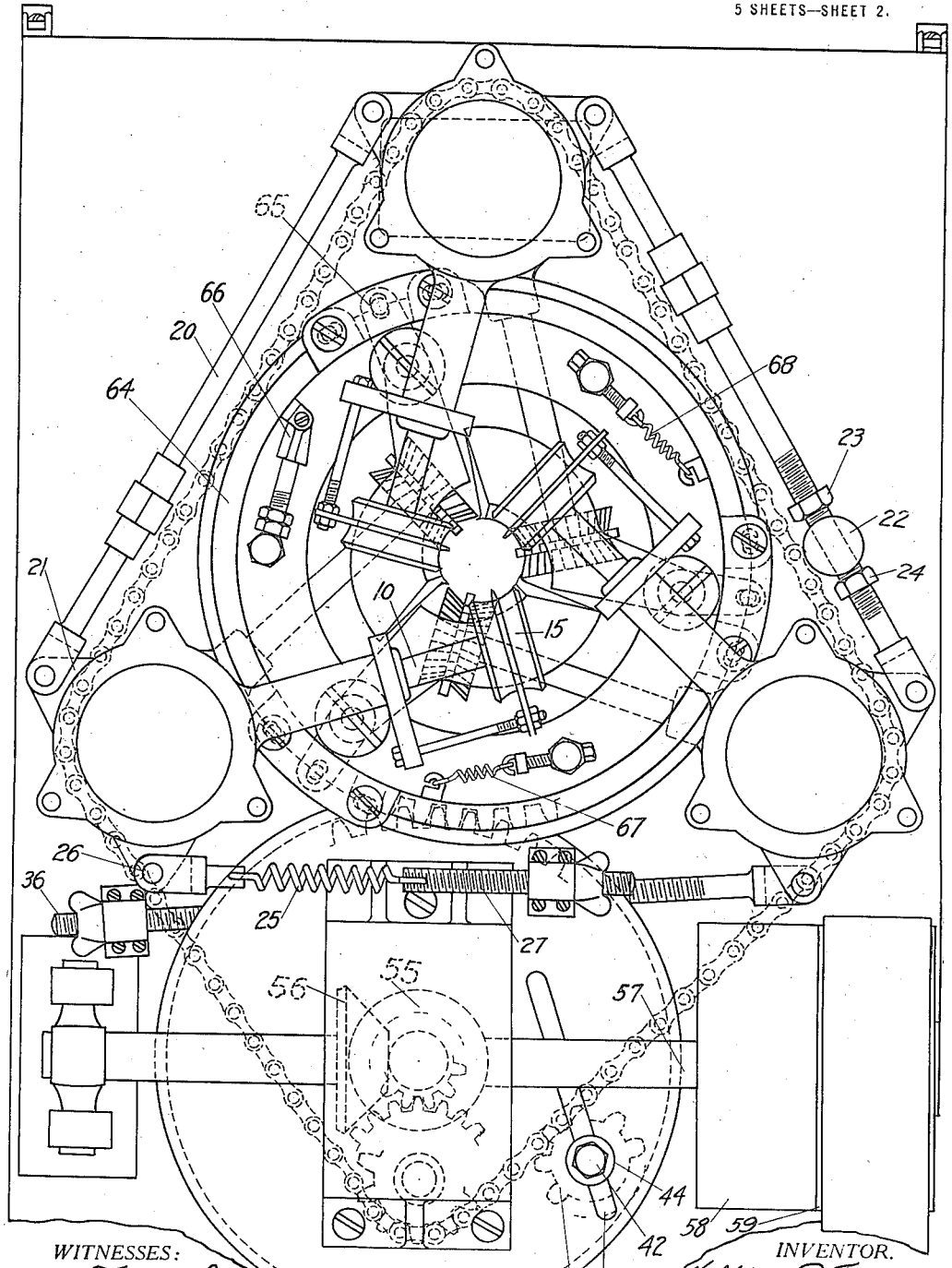
Fig. 2 is a top plan view of a structure shown in Fig. 1 and illustrating the location of the feeding rollers, the cutting knives and the driving chain.

Each shaft 10 carries upon its end a feed roller construction which may be varied as to form but which desirably contains certain important features to be indicated. This feed roller construction is shown in Figs. 2 and 3 as a single unit construction although the preferred form is a multiple unit construction as illustrated in Figs. 4, 5 and 6. In Figs. 2 and 3 the single unit is a roller 15 having a concave surface 16 and supplemented by a knife blade 17 of angular form and held against rotation by a bolt 18. The knife blade 17 is shown supplemented by a shoe 19 on either side thereof.

The preferred structure illustrated in Figs. 4, 5 and 6 contemplates the provision on the shaft 10 of a multiple unit structure, that is, superposed rollers supported on each of the shafts 10. Specifically, it comprises feed rollers 115 practically identical with feed rollers 15 and having a concave surface 116 with blades 117. These blades are secured by bolts 118 and carry shoes 119. Pivotally mounted and extending upward from the shafts of each roller 115 is a gear housing 120 carrying a feed roller 121 at its upward end of the shaft 122 and inclosing gears 123, 124 and 125 which insure simultaneous rotation of rollers 115 and 121 and yet permit independent yielding. The said rollers however are normally in vertical alinement and the yielding of each roller 121 independently of its complemental roller 115 is against spring 126 on bolt 127, this bolt being pivoted to the rigid arm 128. The rollers are preferably made of very soft rubber so that they will have a friction grip upon the ears of corn.

Particular attention is directed to the blades 17 and 117. It is an important departure from the devices hitherto used in feeding green corn and particularly in feeding green corn against relatively rotatable cutting knives. I have found it of great practical importance to provide this nonfeeding element as a supplement to the feeding element or elements. It does not feed the ears of corn but it bites into the cob and braces from the cob itself rather than from the kernels of the cob. This is highly important. In a machine wherein the ears of corn are relatively rotatable, this blade has a further function of precluding rotation of the ears due to the torsional stresses of the cutter knives. I believe I am the first to use any blade as a supplement to feeding elements, which blade bites into and braces directly from the cob rather than from the kernels. It is extremely desirable and a notable improvement that this bracing blade be angular so as to present an elongated bracing edge and it is also very worthy of note that the bracing blades extend well down into close proximity to the cutting knives as is shown in Fig. 3.

The rollers 15 are preferably of rubber or other frictional material. These shafts 10 of the feed units preferably extend inwardly, all on one side of lines drawn from the axes of shafts 6 to the axis of the path of the ears, while the lower feeding rollers, to be described, extend inwardly all on the opposite side of lines drawn from the axes of shafts 6 to the axis of the path of the ears. This will appear best from Fig. 2 and it will be noted that an inevitable equalization results from the different lines of force thus applied to the ears of corn.

The ring portions 13 of the sleeve structure which carries the shaft 10, while having ball bearing mountings so as to be readily movable, are joined together by adjustable rods 20 connected to their perforate ears 21 (see Fig. 2). Movement inwardly and outwardly of the feed rollers is limited by stop pins 22 through which one of these arms passes. This stop co-acts with adjustable nuts 23 and 24. The inward and outward movement of the feed rollers which results from the oscillation of these rings 13 is further constantly subjected to control by a coil spring 25 connected to one of the rings as at 26 and connected to an adjustable screw 27. The spring tends to move the feed rollers toward each other. This structure clearly appears in Fig. 2 and it will be noted that these upper feeding rollers have a limited movement outward or toward the center of an ear of corn, this movement being permitted or effected by the spring 25 which causes the rollers to automatically conform to the variations in the ears.

Figures 13, 14:
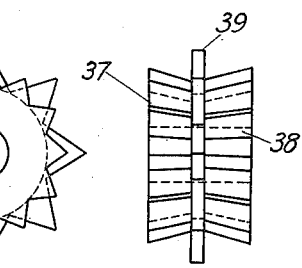
Fig. 13 is an edge view of one of the rollers used in drawing the cobs from the knives after the kernels have been severed therefrom.
Fig. 14 is a side elevation of the roller shown in Fig. 13.
Figure 12:
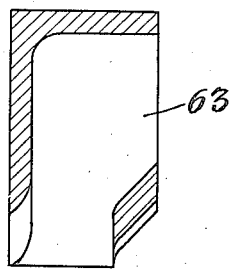
Fig. 12 is a section taken along line 12—12 of Fig. 10.

The lower feed rollers are mounted in a manner identical with the upper feeding rollers with the exception of the angle upon which they extend into the center of the machine. They comprise radial shafts 28, a bevel gear 29 also co-acting with a bevel gear 30 for driving the shaft 8 and a sleeve structure 31 abbreviated more than the sleeve structure 12 to eliminate stationary holding surfaces for the cut kernels of corn. This sleeve structure 31 is part of a ring like formation 32 having a ball bearing mounting. These ring members 32 are connected in a manner identical with the formation 13 of the upper feeding rollers by adjustable rods 33 (see Fig. 1). They are limited in their movements by co-action of the nuts 34 with the pin 35 and they are under spring control by the element 36 partially shown in Fig. 2. The lower feeding rollers *per se* may be designated 37 and their peripheries are provided with transverse corrugations 38 and are angularly concave, being supplemented by a rigid star wheel formation 39. The structure of these rollers is best illustrated in Figs. 13 and 14.

The feeding rollers are all driven at the same rate of speed by co-action of all of the shafts 6 with an encompassing chain 40 disposed immediately beneath the plate 1, through which the shafts 6 extend, each shaft being provided on its lower end with a sprocket wheel 41. A chain tightening means is shown in Fig. 2 and comprises a shaft 42 carrying an idle sprocket 43 and clamping nut 44 and adjustable in a slot 45. The operation will be apparent.

The knife structure is illustrated applied to the machine in Figs. 2 and 3 and the different parts thereof are further illustrated in Figs. 7, 10, 11 and 12. This knife structure (see Fig. 3) comprises a metal shell 46 having flanges 47 and supported in an opening 48 of the plate 1 by such flanges. Concentric with the shell 46 is an inclosing shell 49 having openings at 50 into and through which extend the lower feed rollers. Supported upon the upper end of the interior shell 46 is a rotating casting 51 having a rack periphery 52 for co-action with a driving wheel 53 carried upon the vertical shaft 54 driven by the co-action of bevel gears 55 and 56 under the impetus given to the shaft 57 having pulleys 58 and 59.

The rotating casting 51 has a ball bearing mounting at 60 and the upper portion 61 of this casting receives fulcrum pins 62 of knife arms 63 which are intermediately fulcrumed and attached to an encompassing ring 64 at their outermost ends by a pin and slot connection 65. This casting revolves and carries the knife and ring structure with it, while the knives are limited in their inward and outward movements by bolts 66 connected to the casting and to the ring. Springs 67 and 68, whose tension may be adjusted in a manner apparent, tend to move the knives inward by tending to rotate the ring 64, which ring has the pin and slot connection 65 with the outermost ends of the intermediately fulcrumed knife arms.

Each knife arm 63 carries a blade 69 and has a shoe 70 so located as to bear upon the cob after the kernels have been removed therefrom. These blades and shoes both act to regulate the depth of the cut and grip the cob to prevent wabbling.

An important feature of my invention arises from the fact that the edge 71 of each knife is movable along the radius of the cob as opposed to being movable along the chord of the cob.

From my description of the feeding and guiding mechanism, it will appear that I have pointed out and practically adhered to what I have found to be the bare essentials of a practical commercial machine of the spiral cutting type. The preferred manner of gripping the ears at a plurality of spaced locations has been made clear with the exception of the practically essential feeding structure illustrated in Figs. 4, 5 and 6. The upper feed rollers shown in Fig. 3 may operate alone with reasonable success under certain conditions, but I have found it important to provide a structure involving yieldable members supplemental to the main upper feed rollers. The result is a funnel structure whose walls automatically advance and recede to conform to variations of the ears.

Other means may serve, but I have found the means shown in these three figures to be the most effective. This means takes the form of feed rollers 115 practically identical with feed rollers 15 and having concave surfaces 116 and blades 117. The blades are secured by bolts 118 and carry shoes 119. Pivotally mounted and extending upward from the shafts of each roller 115 is a gear housing 120 carrying a feed roller 121 at its upper end a shaft 122 and inclosing gears 123, 124 and 125 which insure simultaneous rotation of rollers 115 and 121 and yet permit independent yielding. The said rollers, however, are normally in vertical alinement and the yielding of each roller 121 is against spring 126 on bolt 127, this bolt being pivoted to the rigid arm 128.

In operation the ears of corn are successively introduced into the upper feed rollers and are propelled downwardly, the feed rollers 115 yielding bodily against the tension of the spring controlling them jointly and the feed rollers 121 yielding independently. At once, it will appear that the ears are grasped at two spaced locations while being propelled. The normal-size ear is still so held when the cutting action is initiated by the rotating knife structure. In addition, each ear is prevented from rotating under torsional stress from the knives by these blades 117 and is prevented from wabbling by these blades and shoes 119.

When the cutting has well started, the ear is further gripped by the shoes on the knife arms and the rigidity of the holding action further increased. As the cobs pass below the knife structure they are gripped by the lower feed rollers at such points that the pressure of the upper feed rollers is equalized.

The whole result is the holding of the cob in a central line of passage without wabbling and while giving the least possible opportunity for destructive bending of the cob which is always of a springy nature.

When the cob leaves the lower feed rollers it passes into the chute 75, while the cut kernels drop into the receptacle 76 and are removed therefrom through the removable gate 77.

Having thus described my invention what I claim is:

1. In a machine for cutting green corn from the cob, relatively rotating knives, and sets of superposed feed rollers for introducing the ears to the knife structure, the units of each set being relatively yieldable.

2. A machine for cutting green corn from the cob comprising knife structure, sets of multiple feed rollers for introducing the ears to said knife structure, the units of each set being relatively movable bodily.

3. A machine for cutting green corn from the cob comprising knife structure, sets of multiple feed rollers geared together but with their units relatively yieldable and designed to introduce the ears to said knife structure.

4. A machine for cutting green corn from the cob comprising knife structure, feeding means, and radially mounted shoes immediately above the knife structure and independent thereof to center the ears.

5. A machine for cutting green corn from the cob comprising knife structure, feeding means, radial blades gripping the ears to prevent turning, and shoes immediately above the knife structure and independent thereof to center the ears.

6. A machine for cutting green corn from the cob comprising knife structure, centering shoes immediately above said knife structure, a set of feeding rollers above said shoes, and a set of relatively yieldable elements above said feeding rollers.

7. A machine for cutting green corn from the cob comprising knife structure, centering shoes immediately above said knife structure, and sets of superposed rollers for feeding the ears, the units of each set being independently yieldable to conform to the variations in the ears.

8. A machine for cutting green corn from the cob comprising knife structure, centering shoes, blades to prevent turning of the ears, a set of feed rollers, and elements yieldable independently of said feed rollers for the initial reception of the ears of corn.

9. A machine for cutting green corn from the cob comprising knife structure, centering shoes, blades to prevent turning of the ears, and sets of superposed feed rollers for feeding the ears, the units of each set being independently yieldable to conform to the variations in the ears.

10. A machine for cutting green corn from the cob comprising knife structure, feeding means, and angular blades to prevent turning.

11. A machine for cutting green corn from the cob comprising knife structure, feeding means, and blades having elongated edges which bite into the ears to prevent turning.

12. A machine for cutting green corn from the cob comprising knife structure, feeding rollers, and blades with elongated edges biting into the ears to prevent turning, said blades extending outwardly from the peripheries of said rollers.

13. A machine for cutting green corn from the cob comprising relatively yieldable feeding elements, yieldable knives, and yieldable shoes, said elements and shoes gripping the ears during cutting.

14. A machine for cutting green corn from the cob comprising upper feeding means, lower feeding means, interposed knife structure, ear-gripping shoes on said knife structure, and relatively independent shoes immediately above said knife structure.

15. A machine for cutting green corn from the cob comprising upper feeding means yieldable to conform to the ears, lower feeding means yieldably gripping the cobs, knife structure comprising yieldable knives carrying cob-gripping shoes, and relatively independent shoes immediately above the knives.

16. A machine for cutting green corn from the cob comprising upper feeding means yieldable to conform to the ears, lower feeding means yieldably gripping the cobs, knife structure comprising yieldable relatively rotatable knives carrying cob-gripping shoes, shoes immediately above the knives, and blades biting into the ears to prevent turning.

17. A machine for cutting green corn from the cob comprising a rotating series of yieldable knives, centering shoes immediately above said knives, sets of superposed feed rollers above said knives and with their units relatively yieldable, yieldable feed rollers below said knives, and gripping shoes on said knives.

18. A machine for cutting green corn from the cob comprising a rotating series of yieldable knives, centering shoes immediately above said knives, sets of superposed feed rollers above said knives, the units of each set being independently yieldable and geared together, yieldable feed rollers below said knives, and gripping shoes on said knives.

19. In a machine for cutting green corn from the cob, the combination of knife structure rotatable in operating upon the ears of corn in which a series of knives are yieldable, one resilient means against which such knives are yieldable, and feeding means in which a series of feeding elements are yieldable, a single resilient means against which said elements are yieldable.

20. A machine for cutting green corn from the cob comprising upper feed rollers, knife structure, and lower feed rollers, said upper feed rollers being vertically pivoted and extended inwardly on one side of a line drawn from the axes of their pivots to the axis of feed, said lower feed rollers being vertically pivoted and extended inwardly on the other side of a line drawn from the axes of their pivots to the axis of feed.

21. A machine for cutting green corn from the cob comprising knife structure, feed rollers for introducing the ears to said knife structure, said rollers mounted to yield about a pivot, feed rollers for removing the cobs from said knife structure and mounted to yield about a pivot, said first rollers being mounted to yield in an opposite direction to said last rollers.

22. A machine for cutting green corn from the cob comprising upper feed rollers, knife structure, and lower feed rollers, said upper feed rollers being vertically pivoted and extended inwardly on one side of a line drawn from the axes of their pivots to the axis of feed, said lower feed rollers being vertically pivoted and extended inwardly on the other side of a line drawn from the axes of their pivots to the axis of feed, the feed rollers of said lower set being in staggered relation to the feed rollers of the upper set.

23. In a machine for cutting green corn from the cob, feed rollers, vertical shafts from which said feed rollers are driven, sprockets on said shafts, and a single chain for driving said shafts through said sprockets.

24. In a machine for removing green corn from the cob feed rollers, and means joining said rollers together for simultaneous movement, said means being adjustable to vary the relation of said rollers.

25. In a machine for removing green corn from the cob, a feed roller having a corrugated periphery with a feeding central extension of said periphery.

26. In a machine for removing green corn from the cob, a feed roller having a corrugated concave periphery with a central star extension of said periphery.

27. A machine for cutting green corn from the cob comprising knife structure, feeding means, and non-rotatable blades mounted upon said feeding means for longitudinally gripping the ears to brace them.

28. A machine for cutting green corn from the cob comprising knife structure, feeding means, and non-feeding means in conjunction with said feeding means and designed to bear on the cob above the knives.

29. A machine for cutting green corn from the cob comprising knife structure, feeding means, and non-rotatable blades secured to said feeding means and adapted to bite into the ears in the direction of their travel to brace them while permitting feeding.

30. A machine for cutting green corn from the cob comprising knife structure, feeding means, and radially extending non-rotatable blades biting into the ears while permitting feeding, said blades being non-yieldable with relation to said feeding means.

31. A machine for cutting green corn from the cob comprising knife structure, feeding means, and non-feeding angular blades biting into the ears.

32. A machine for cutting green corn from the cob comprising knife structure, feeding means, and non-feeding blades extending below the feeding means to points adjacent the knife structure.

33. A machine for cutting green corn from the cob comprising knife structure, feeding means, and biting blades diverging upward and outward from points adjacent said knife structure.

34. A machine for cutting green corn from the cob, comprising knife structure, feeding means, blades with rectilinear cutting edges biting longitudinally into the ears being fed by said feeding means through said knife structure, and means for maintaining the lines of direction of said rectilinear cutting edges with relation to the longitudinal axes of said ears.

35. A machine for cutting green corn from the cob, comprising knife structure, feeding means, blades with rectilinear edges for longitudinally gripping the ears being fed by said feeding means through said knife structure, means permitting transverse movement of said blades, and means to prevent tilting of said blades.

36. A machine for cutting green corn from the cob, comprising knife structure, feeding means, and non-tiltable blades with a rectilinear edge for longitudinally gripping the ears being fed by said feeding means through said knife structure.

37. A machine for cutting green corn from the cob, comprising knife structure, feeding means, and rectilinear blades coöperating and positioned with such relation to said feeding means as to brace the ears in their passage to said knife structure.

38. In a machine for cutting green corn from the cob, feeding elements pivotally mounted, and rods joining together said elements so that their movements are synchronous.

39. In a machine for cutting green corn from the cob, feeding elements pivotally mounted, rods joining together said elements, and resilient means coacting with said rods to tension said elements.

40. In a machine for cutting green corn from the cob, feeding elements pivotally mounted, rods joining together said elements, resilient means coacting with said rods, and adjustable means coacting with said resilient means to vary the tension of said elements.

41. In a machine for cutting green corn from the cob, feeding elements pivotally mounted, rods joining together said elements, a stop coacting with said rods, and adjustable means coacting with said stops whereby the position of said elements at which said stop is effective may be varied.

42. In a machine for cutting green corn from the cob, feeding elements pivotally mounted, rods joining together said elements, and a stop coacting with said rod to limit the movement of said elements.

43. In a machine for cutting green corn from the cob, feeding elements pivotally mounted, rods joining together said elements, a stop to limit the movement of said elements, and resilient means coacting with said rods to tension said elements.

In testimony whereof I hereby affix my signature.

WILLIAM B. FENN.